Jan. 26, 1971  G. B. ZURHEIDE  3,558,293
MANUFACTURE OF FIBER GLASS
Filed Aug. 1, 1967  2 Sheets-Sheet 1

INVENTOR
GEORGE B. ZURHEIDE
BY
ATTORNEYS

Jan. 26, 1971  G. B. ZURHEIDE  3,558,293
MANUFACTURE OF FIBER GLASS
Filed Aug. 1, 1967  2 Sheets-Sheet 2
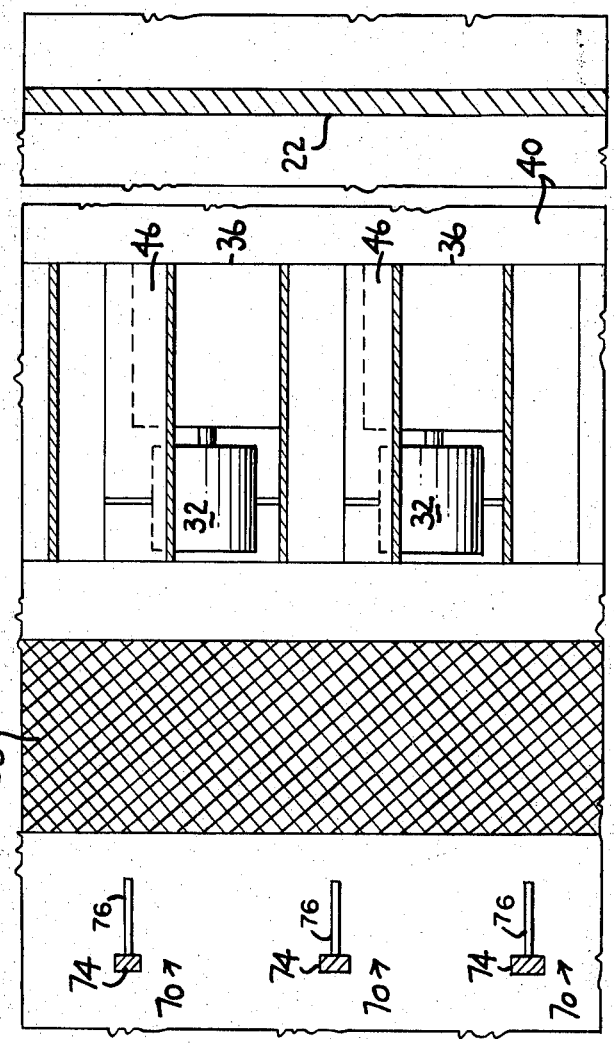
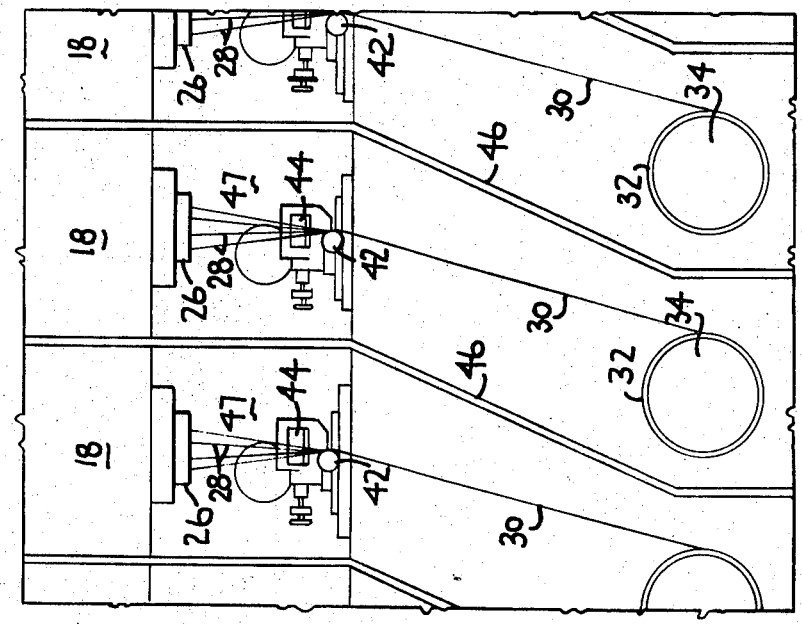
INVENTOR
GEORGE B. ZURHEIDE
ATTORNEYS United States Patent Office 3,558,293
Patented Jan. 26, 1971

3,558,293
MANUFACTURE OF FIBER GLASS
George B. Zurheide, Upper St. Clair, Pa., assignor to PPG Industries, Inc., a corporation of Pennsylvania
Filed Aug. 1, 1967, Ser. No. 657,622
Int. Cl. C03b 37/00
U.S. Cl. 65—2
3 Claims

ABSTRACT OF THE DISCLOSURE

In the art of manufacturing glass fibers and strands, fibers are drawn from bushings containing a quantity of molten glass supplied from an elongated forehearth connected to a glass melting tank. The fibers from each bushing are grouped into a strand and collected on a driven rotating member of a winder. The drawing or forming room is separated and sealed from the furnace hall by a wall and ceiling and opens into the processing room of the factory. The roof of the forming room is defined in part by forehearth structure. An air curtain separates the forming room from the processing room, the air being delivered from a location in front of the bushings between the rooms and in a generally downwardly direction. An additional but smaller quantity of air is delivered from a location behind the bushings, also in a generally downwardly direction and past the motor of the winder, so as to cool the same. Reduced pressure zones are established by variable speed fans and dampers below the floor of the forming room, one below the winder and another at a location spaced laterally therefrom substantially in line with the air curtain. That air which is entrained with the fibers and strand and passes the winder is exhausted below the winder and substantially in line with the path of the strand; a major percentage of the air of the air curtain is exhausted at the other low pressure zone in front of the strand path and is recirculated in the air supply system. All delivered air is directed generally downwardly; the fibers and strand entrain air by their movement; however, no air from a supply is specifically directed to the strands.

BACKGROUND OF THE INVENTION

In the process of manufacturing glass fibers, a plurality of glass fibers are drawn through tips of a bushing from a body of molten glass in the bushing, the fibers are grouped as a strand and then collected on a rotating member of a winder driven by an electric motor. A binder is applied to the fibers, so as to maintain strand integrity. Generally, the forming room in which fibers and strand are produced is located beneath the forehearth of a melting tank; the forehearth, which contains the bushings on the bottom thereof, is an elongated T-shaped extension of a canal from the tank or a double T-shaped extension wherein there are spaced parallel forehearths, such that the space allotted for producing the fibers is generally quite limited. Because of the proximity of the forehearth to the workers in the forming room, the temperature is such as to be uncomfortable. Heat is also generated by the electric motors of the winders. In the forming room, in close proximity to the forehearth, operators group the fibers into a strand, place the strand so formed in the guide which groups the fibers automatically, and wraps the strand on the rotating winder member. It is customary to comfort-condition the room by supplying conditioned air thereto, and it has been the practice to supply adjustable but constant volume and velocity air with constant temperature on the order of 80° F. and a relatively high humidity, as on the order of 66 percent. The conditioned air has been supplied from a location in front of the forming station and exhaust below the winder into a waste chute directly below the winder in line with the path of the strand. The strand, moving downwardly at a rapid rate of speed, which may be as great as 50,000 feet per minute, induces air to follow its path, so that currents of air are induced in the forming room by the strand pulling air therewith. Such air currents are generally erratic and are thus uncontrolled. Some of these air currents flow into the zone of fiber formation with such velocity as to interrupt or modify adversely optimum fiber-forming conditions. Furthermore, the rotating winder member on which the strand is collected acts as a pump, causing other air currents to be generated. In the absence of control, the latter air currents can be so severe as to pump dirt, dust and/or binder thrown off from the strand into the critical fiber-forming zone, and to thus disrupt the fiber-forming process.

In U.S. Pat. No. 3,271,122, granted Sept. 6, 1966, to D. W. Denniston et al., cooled and conditioned air is delivered adjacent the bushing downwardly along the path of the fiber and strand, past the winder and exhausted below the winder in order that particles of binder thrown from the strand are carried with the air to a collecting zone below the winder. A zone of reduced pressure is established below the waste chute which is directly below the winder and in the path of the strand, so as to ensure air travel in the direction indicated. A similar flow of conditioned air is shown by J. B. Holschlag in U.S. Pat. No. 3,304,163, granted Feb. 14, 1967.

However, the usual forming room is an elongated tunnel, defined by walls having openings therethrough for a conveyor or conveyors to pass on which completed strand-forming packages are placed by the operators. There usually are several forehearths opening into the room. Many different diameter fibers are formed, each seeking its own quantity of entrained air. Such construction and operation, even with the low pressure zone established below the winders, leads to erratic and uncontrolled air currents which have a tendency to influence the fiber-forming process and produce yardage variations in the strand, the yardage variations being manifested as variations in fiber diameter along their length.

SUMMARY OF THE INVENTION

According to this invention, the forming room is an extension of the processing room, being sealed from the furnace hall by a wall and ceiling structure, so that there is no interchange of atmosphere therebetween. The forming room is thus open to the factory atmosphere of the fiber processing room in which the temperature is controlled. In the fiber processing room, the forming packages produced in the forming room are processed by being twisted and plied into yarn or other operations are performed on the strand, which ultimate product is shipped to other manufacturers who, for example, weave the yarn into fabric, etc.

To provide a barrier between the forming room and the processing room, an air curtain is provided. Air for the air curtain is discharged from a position adjacent the forehearth level downwardly, and the major portion thereof, about 80 percent, is exhausted at a location spaced from and in front of the winders. To exhaust this air, a low pressure zone is created by a variable speed fan and damper system at the location of discharge. The remainder of the air of the air curtain which is probably entrained by the fibers is discharged down the waste chute below the winder and is exhausted to the atmosphere.

In addition to the air curtain, a smaller quantity of air, for example, one-fourth the amount of the air current, is discharged generally downwardly from a location also at the forehearth level and at the rear thereof, so as to pass the winder motor, cool the same and the exhausted via the waste chute.

The system, because of its arrangement with respect to the forming room and processing room, can be so adjusted as to pull air from adjoining areas thereby assuring uniform differences in temperature and relative humidity on each side of the air curtain.

Each fiber-forming position seeks its own quantity of air to be entrained by the fibers and strand; none is supplied for this specific purpose.

To convey forming packages from the forming room to the processing zone, a conveyor is provided; this conveyor is positioned at the fringe of the air curtain and not within the forming room thus described. Thus, no erratic air currents can be traced to the conveyor or its operation.

BRIEF DESCRIPTION OF THE DRAWINGS

FIG. 2 is a partial plan view taken on line 2—2 of FIG. 1, and FIG. 3 is a front view of the forming stations showing various details of the environment in a forming zone.

DESCRIPTION OF THE PREFERRED EMBODIMENT

Figure 1:
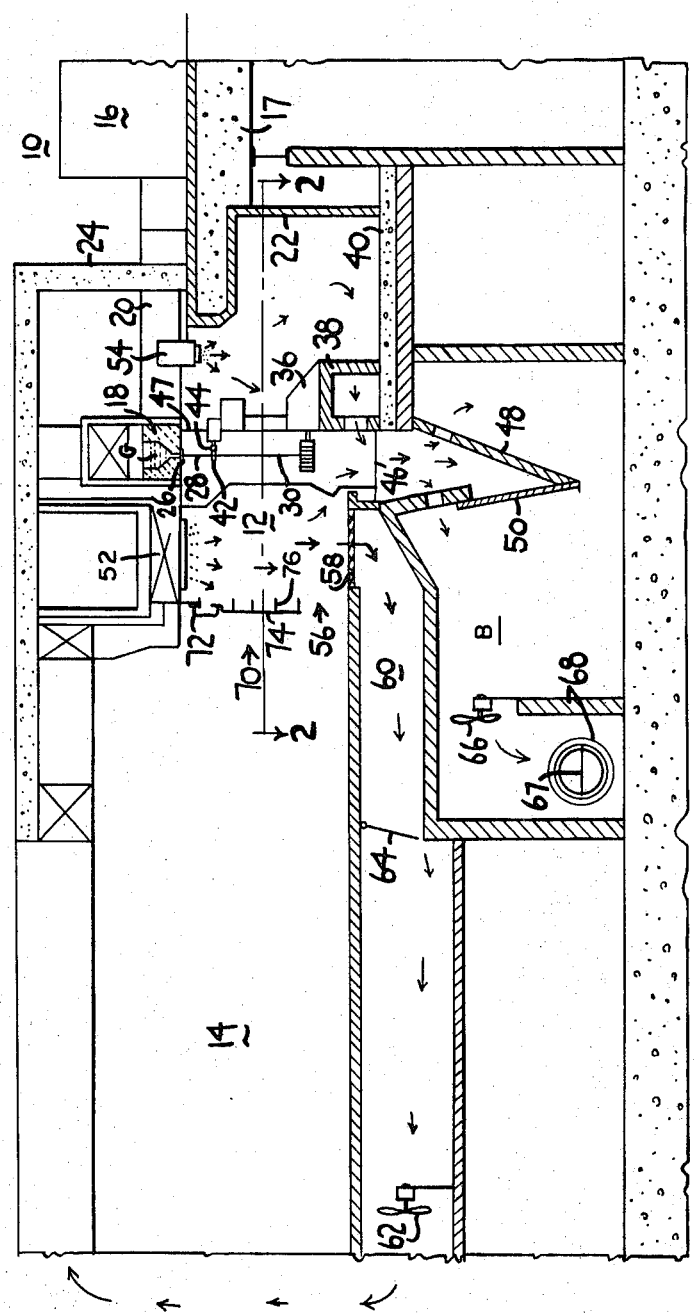
FIG. 1 is a sectional view of a fiber-forming arrangement according to this invention.

Looking now at the drawings, there is illustrated a fiber-forming arrangement incorporating the present invention. In FIG. 1, there is indicated schematically a furnace hall 10, a forming room 12 and a portion of a fiber processing room 14. The function of the processing room has previously been described.

A melting furnace 16 is located in the furnace hall 10 on a concrete floor 17 and is connected to a fiber-forming forehearth 18 by a canal 20. The furnace hall 10 is isolated and sealed atmospherically from the forming room 12 by wall and ceiling structure 22 and 24.

Molten glass from the furnace 16 is delivered through the canal 20 to the forehearth 18 and supplies bushings 26 located in the bottom of the forehearth with molten glass. As in conventional fiber-forming arrangements, each bushing, of which there are a plurality in a forehearth, is provided with a plurality of orifices for the passage of molten glass to be drawn as fibers 28 therefrom. The fibers are gathered into a strand 30 which is wound as a forming package on a rotating tube 32 on a mandrel 34 of a motor-driven winder, generally identified at 36. The winder is supported on a frame 38 mounted on a rear floor 40 of the forming room 12.

A gathering shoe 42 and a binder applicator 44 respectively gathers the fibers 28 into the strand 30 and applies a binder thereto to maintain strand integrity.

Because there are a plurality of bushings 26 in a forehearth 18, there are a plurality of forming stations, each including a bushing 26, a gathering shoe 42, a binder applicator and a winder 36. To separate each station from the next adjacent station, sheet metal dividers 46 are provided between adjacent positions. These are angled as illustrated in FIG. 3 such that the strands 30 are delivered from the gathering shoe 42 to the winder 36 at an angle which ensures fiber contact with the shoe. At the rear of each position, there is a partition 47.

Directly below the winders there is a waste chute into which waste fibers fall. Communication to the waste chute is by way of an opening or openings in the floor. The waste chute 48 has a vertical sliding door for removal of waste collected therein. Generally the chute is supported in such a manner that air can pass thereover.

As illustrated in FIG. 1, there are two air ducts, one identified as 52 on the processing room side of the forming station and another, identified as 54, on the rear side of the winder.

Conditioned air is supplied to the ducts 52, 54 so as to be discharged downwardly therefrom through suitable grates and low pressure zones are established below the winder level, as will be hereinafter explained.

Of the two duct systems, the larger quantity of air is delivered from the duct 52 downwardly to form an air barrier or curtain 56 between the forming room 12 and the processing room 14. A large percentage of air of the curtain 56, as for example 80 percent, passes through a floor grate 58 into a return duct system 60 and is recovered so as to be reused. Basically, this air is relatively clean and free of contaminants from the fiber processing. A low pressure is established in the duct 60 by means of a variable speed fan 62 and a damper 64 for return of this air. The remainder of this air is drawn toward the fibers and strand and passes down the waste chute 48.

Beneath the winder and the opening to the waste chute in the basement B, a low pressure zone is established by a variable speed fan 66 and louvers or a damper 67.

A quantity of air is delivered from the duct 54 and the larger percentage of such air passes across the motor of the winder 36, cools the same and then down the waste chute. Some of the air is drawn to the fibers and passes downwardly therewith. Generally the quantity of air from the duct 54 is about 20 percent of that from the duct 52.

The air which passes through the waste chute is generally contaminated with foreign material and is exhausted through suitable ductwork, as duct 68 to the atmosphere.

At the periphery of the air curtain or barrier 56, and on the processing room side thereof, there is a conveyor 70 for conveying the filled forming tubes to the processing area. A typical conveyor includes a monorail 72 on which is supported a series of depending rack portions 74 having spindles 76 for receiving the filled forming tubes. The spindles also transport blank forming tubes which the operator removes, places on a winding drum 34 for filling. The conveyor may be of any extent, so as to convey the filled forming tubes to a desired location. Because of the position of the conveyor relative to the forming room, there is little, if any, air disturbances caused thereby.

The total quantity of air delivered for a single forehearth, 74 feet in length, having 44 bushings and thus forming positions with air ducts coextensive in length to said forehearth, is, in a typical installation, 50,000 c.f.m.; 40,000 c.f.m. is delivered by the duct 52 and 10,000 c.f.m. is delivered by the duct 54. The temperature of the air is approximately 80° F. and the relative humidity is approximately 66 percent. Approximately 40,000 c.f.m. is recirculated while the remaining 10,000 c.f.m. is contaminated and is exhausted to the atmosphere.

The area around the bushing is essentially open in the front and rear with minimum obstructions. The divider 46 separates the adjacent bushing position all the way from the forehearth to the chute. The rear partition 47 begins about 18 inches below the forehearth. The idea of the dividers 46 and rear partitions 47 is that they be positioned to permit air flow for the fibers when required but to eliminate cross-draft between positions of any consequence which would blow the filaments out or permit the entrance of fuzzy dirt.

The general layout arrangement with the forming room opening into the processing room ensures unimpaired working conditions, as will be apparent to one skilled in the art.

I claim:

1. In a process of producing glass fibers including the steps of drawing a plurality of glass fibers downwardly from a supply of molten glass in a bushing, said bushing being in the bottom of an elongated forehearth connected to a glass melting tank located in a furnace hall, grouping said fibers as a strand moving along a downwardly directed path, collecting the strand on a rotating member driven by a motor which generates heat, establishing a low pressure zone below said rotating member such that foreign material moving with the strand is carried past the rotating member into a waste chute located below the rotating member, the drawing, grouping and collecting being conducted in a forming room in which erratic air currents may exist and in which air is entrained by movement of the fibers and strand, said erratic air currents tending to disrupt the continuity of the process, the improvement which comprises drawing, grouping and collecting said fibers and strand in a forming room separated from the furnace hall by a wall and open at its front into a large processing room, delivering a quantity of air from a location behind the supply of molten glass and bushing adjacent to said wall in a downward direction generally parallel to the path of said fibers and strand and toward said motor so that a substantial portion thereof passes said motor and cools the same, delivering a larger quantity of air from a location in front of said supply of molten glass and bushing so as to provide an air curtain separating said forming room from said processing room, a substantial portion thereof moving in a downward direction generally parallel to the path of said fibers and strand, and thereafter removing the air which is used to cool the motor and said substantial portion of the air forming the air barrier.

2. A process as recited in claim 1, wherein said air is delivered at a temperature of about 80° F. and about 66 percent relative humidity.

3. A process as described in claim 1, wherein a portion of said removed air is recirculated and redelivered after it is cleaned and conditioned to a temperature of approximately 80° F. and approximately 66 percent relative humidity.

References Cited

UNITED STATES PATENTS

| 3,271,122 | 9/1966 | Denniston et al. | 65—12X |
| 3,304,163 | 2/1967 | Holschlag | 65—11W |

S. LEON BASHORE, Primary Examiner

R. L. LINDSAY, Jr., Assistant Examiner

U.S. Cl. X.R.

65—11, 12